United States Patent Office 3,494,222
Patented Feb. 10, 1970

3,494,222
SPEED CHANGE GEAR SYSTEM
Tadashi Hirota and Shigemi Hirota, Tokyo, and Kojiro Suzuki, Yokohama, Japan, assignors to K. K. Taiyosha, Tokyo, Japan, a company of Japan
Filed June 19, 1968, Ser. No. 738,278
Int. Cl. F16h *37/12*
U.S. Cl. 74—665   4 Claims

ABSTRACT OF THE DISCLOSURE

A speed change gear system comprises a plurality of like gear assemblies on a main shaft, each of the gear assemblies comprising pinions rotatable on pinion shafts radiating from a hollow arbor on the main shaft, a differential gear rotatable on the arbor and meshing with the pinions, an output gear fixed to the differential gear, a connecting frame fixed to the output gear and engaging end portions of the pinion shafts of the next gear assembly, and a connecting gear fixed to the arbor shaft and meshing with the pinions of the next assembly. When the output gear of a selected gear assembly is driven by a suitable power source, the output gears of other assemblies are driven at different speeds which are integral multiples or fractions of the speed at which the output gear of the selected gear assembly is driven.

---

The invention relates to speed change gear systems for providing a plurality of different gear ratios.

In accordance with the present invention, the gear system comprises a plurality of like gear assemblies mounted in series on a main shaft. Each of the gear assemblies is connected with the adjacent assembly so that when any one of the assemblies is selectively driven by an independent power source, all of the other gear assemblies run at speeds which are integral multiples or integral fractions of the input speed. Each of the assemblies includes an output gear to provide for taking off a drive at the desired speed.

Since all of the gear assemblies are alike and of simple construction, the gear system in accordance with the present invention is economical to manufacture and is easy to maintain.

The invention will be more fully understood from the following description of a preferred embodiment shown by way of example in the accompanying drawings in which.

Figure 1:
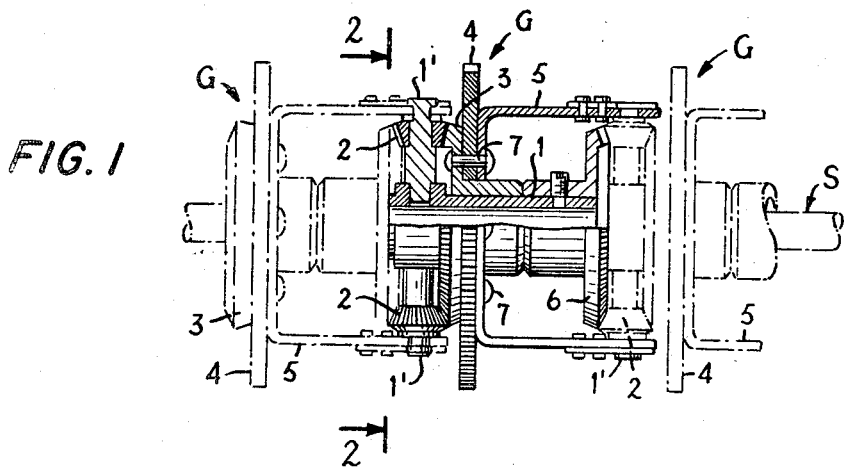
FIG. 1 is a side view with portions in longitudinal section of a gear assembly in accordance with the invention.
Figure 2:
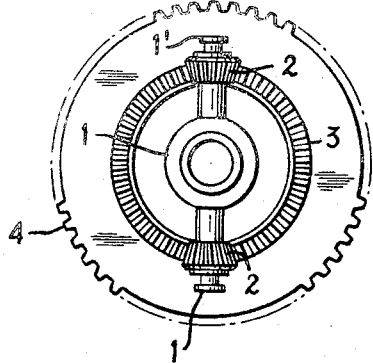
FIG. 2 is a cross section taken on the line 2—2 in FIG. 1.

As illustrated in the drawings, the gear system in accordance with the invention comprises a plurality of like gear assembly units disposed on a main shaft S and connected with one another in series. Each of the units comprises a differential gear assembly having a hollow arbor 1 from which one or more pinion shafts 1' extend in a radial direction. While two diametrically opposite pinion shafts 1' are shown by way of example in the drawing, it is possible to use either more or less than two. A pinion 2 rotatably mounted on the end of each of the pinion shafts 1' meshes with a bevel differential gear 3 which is rotatably mounted on the hollow arbor 1. An output gear 4 and a U-shaped connecting frame 5 are secured to the differential gear 3 by means of rivets 7 so as to rotate together. A bevel connecting side gear 6 of the same shape as the differential gear 3 is fixedly mounted on the hollow arbor 1 by means of set screws 8 so as to rotate with the hollow arbor. At the ends of the opposite arms of the U-shaped connecting frame 5, there are provided openings 9 to receive the ends of the pinion shafts of the next successive unit. A leaf spring 10 is secured to each of the frame arms by screws 12 and is provided with a hole 11 adapted to fit over the end of the corresponding pinion shaft to connect adjacent units with one another.

Figure 7:
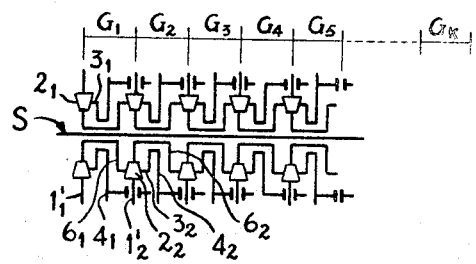
FIG. 7 is a schematic side view illustrating a plurality of gear assemblies on a main shaft.
Figure 6:
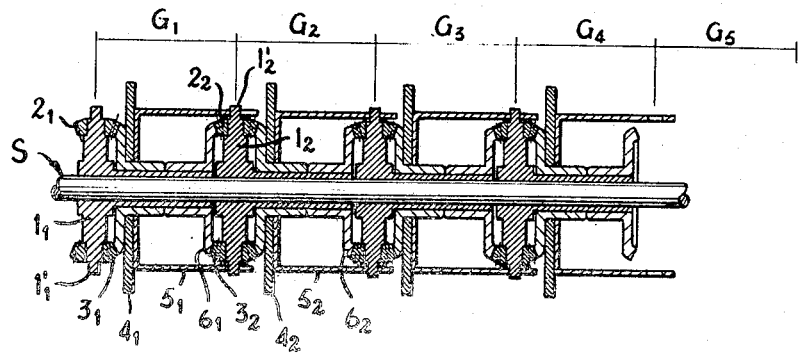
FIG. 6 is a longitudinal sectional view showing a plurality of gear assemblies assembled on a main shaft.
Figure 3:
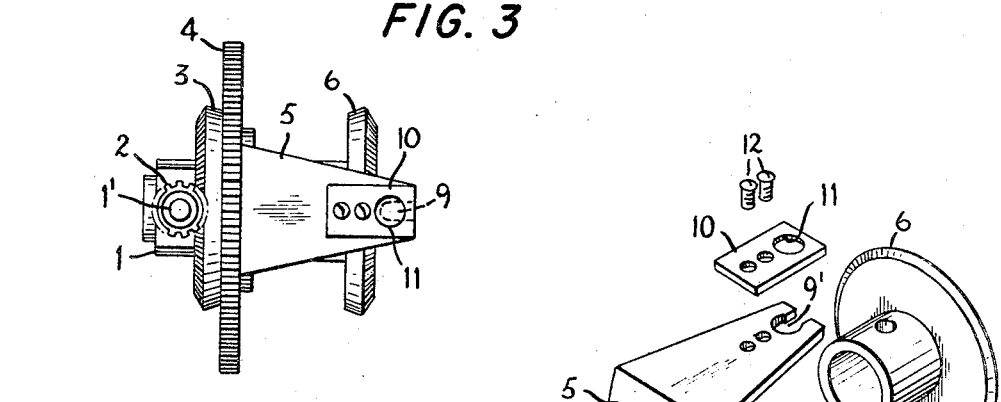
FIG. 3 is a plan view of the gear assembly of FIG. 1.
Figure 4:
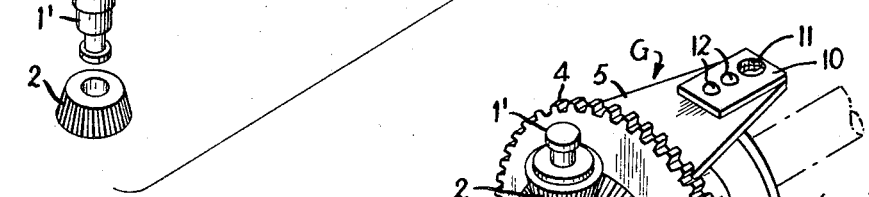
FIG. 4 is an exploded perspective view showing the parts disassembled.
Figure 5:
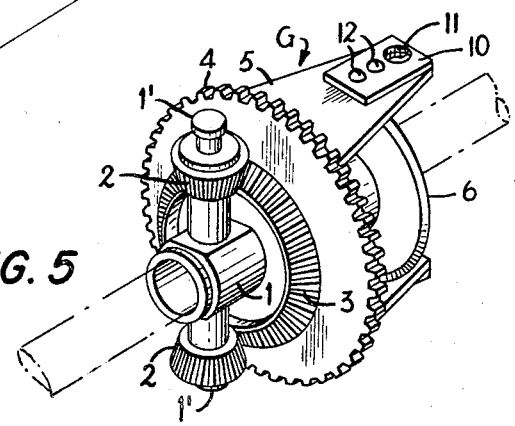
FIG. 5 is a perspective view of the gear assembly.

A gear system in accordance with the invention comprises two or more of the gear assembly units as illustrated in FIGS. 1 to 5 mounted on the main shaft S in series as illustrated by way of example in FIGS. 6 and 7 where the individual gear assemblies are designated G1, G2, G3 . . . G$k$. The component parts of the individual gear assemblies are designated by corresponding subscripts. The hollow arbor $1_1$ of the first assembly G1 only is fixed on the main shaft S. The hollow arbors of the second and succeeding gear assembly units are rotatable on the main shaft. Successive units are connected with one another by means of the connecting frames 5 and the connecting side gears 6. Thus, for example, the ends of the pinion shafts $1'_2$ of the second gear assembly unit G2 are received in the openings 9 of the connecting frame $5_1$ and releasably held in place by the leaf springs 10. When thus connected, the pinions $2_2$ of the second unit mesh with the side connecting gear $6_1$ of the first unit as well as with the differential side gear $3_2$ of the second unit. Successive units are connected with one another in like manner. The number of units used is selected in accordance with the variations of speed required for the system.

Figure 8:
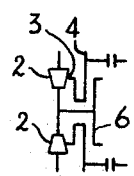
FIG. 8 is a schematic side view of one of the gear assemblies.

The operation of a gear system in accordance with the present invention will be understood from the following explanation in conjunction with FIGS. 6, 7 and 8. Assuming that the connecting side gear $6_1$ is given $(n-m)$ revolutions around the axis of the main shaft S causing the pinions $2_2$ to revolve $n$ times around the shaft axis, the pinions $2_2$ will rotate according to the number of teeth an amount equivalent to $[n-(n-m)]$ around the pinion shafts $1'_2$. Hence, the differential side gear $3_2$ of the second unit will revolve $$n+[n-(n-m)]=n+m$$

revolutions since the gears $6_1$ and $3_2$ have the same numbers of teeth. Thus, if the connecting side gear $6_1$ is fixed to the main shaft and if the pinions $2_2$ are made to rotate $n$ times inducing the output gear $4_1$ to revolve $n$ times, it is conceivable that $n-m=0$, $n=m$ and consequently $n+m=2n$.

Therefore, the differential side gear $3_2$ of the second unit will revolve $2n$ times causing the output gear $4_2$ also to revolve $2n$ times. Thus, the output gear $4_2$ of the second unit runs twice as fast as the output gear $4_1$ of the first unit. In the same manner, the output gear $4_3$ of the third unit will be seen to have a revolution speed of $2n+n=3n$. Similarly, it will be seen that when the gear assembly units G1, G2, G3 . . . G$k$ are connected in series and put in operation, their output gears $4_1$, $4_2$, $4_3$ . . . $4k$ will revolve at the speeds of $n$, $2n$, $3n$ . . . K$n$ respectively, i.e., in a sequence of integral numbers.

Since this action is reversible, it can be seen that when an output gear $4x$ in the $x$ position of the series is given $n$ revolutions, the output gear $4y$ of a unit in the $y$ position will have a revolution speed of $$\frac{y}{x}n$$

Thus, the speed change gear system of the present invention will produce the following combinations of speeds:

(1) If the gear assembly G1 is driven through its output gear $4_1$ at a speed of $n$ revolutions per unit time, the output gears of the other gear assemblies G2, G3 ... G$k$ will run at speeds of $2n, 3n ... kn$ respectively, thus providing a sequence of $k$ different speeds which are integral multiples of the speed $n$ at which the first gear assembly is driven.

(2) If the output gear of the gear assembly G$k$ in the $k$ position is driven at a speed of $n$ revolutions per unit time, the output gears of the other gear assemblies G1, G2, G3 ... G$k-1$ will run at speeds of $$\frac{1}{k}n, \frac{2}{k}n, \frac{3}{k}n \cdots \frac{k-1}{k}n$$

respectively, thus constituting a sequence of $k$ different speeds which are integral fractions of the speed $n$ at which the gear assembly G$k$ is driven.

(3) If the output gear of any selected gear assembly in the train (designated as G$a$ for convenience) is driven at a speed of $n$ revolutions per unit time, the output gears of the other gear assemblies G1, G2 ... (G$a$), G$b$ ... G$k$ will run at speeds of $$\frac{1}{a}n, \frac{2}{a}n \cdots \left(\frac{a}{a}n\right), \frac{b}{a}n \cdots \frac{k}{a}n$$

respectively, thus providing a sequence of speeds having a lower range below the driving speed and an upper range above the driving speed with a predetermined ratio between the respective speeds.

As apparent from the foregoing explanation, the speed change gear system of the invention has the advantage that it comprises a plurality of like differential gear assemblies which are arranged in series on a main shaft in such manner that when the output gear of any selected gear assembly is driven by a suitable power source, the output gears of the other gear assemblies are driven at speeds providing a range of speeds comprising integral multiples or fractions of the driving speed. The main shaft, to which the hollow arbor of one only of the gear assemblies is fixed, may be used as an input or output or may be stationary in which event the output gear of one of the gear assemblies is used as an input and the output gears of the other gear assemblies are used selectively as outputs providing different speed ratios. There is thus provided an effective and economically speed change gear system providing a wide range of speeds either above or below the driving speed or both above and below input speed.

While a preferred embodiment of the invention has been shown by way of example in the drawing and has been herein particularly described, it will be understood that modifications in structure may be made and that the invention is in no way limited to this embodiment.

What I claim is:

1. A speed change gear system comprising a plurality of like gear assemblies on a main shaft, each of said gear assemblies comprising a hollow arbor on said main shaft, at least one pinion shaft extending outwardly from said arbor, a differential pinion on said pinion shaft, a differential gear rotatable on said arbor and meshing with said pinion, an output gear and a connecting frame fixed to said differential gear, a connecting gear coaxial with and fixed to said arbor, and meshing with said pinion of the adjacent like gear assembly, and means connecting said frame with the pinion shaft of the adjacent gear assembly, the arbor of one of said gear assemblies being fixed to said main shaft, whereby when an output gear of a selected assembly is driven from a power source, output gears of other assemblies will be driven at different speeds which are integral multiples or fractions of the speed at which the out gear of said selected assembly is driven.

2. A speed change gear according to claim 1, in which a plurality of equally spaced said pinion shafts extending radially from said arbor.

3. A speed change gear according to claim 1, in which said connecting frame has a portion secured to said output gear and portions extending lengthwise of said main shaft and having openings to receive end portions of pinion shafts of the adjacent gear assembly.

4. A speed change gear according to claim 3, in which said connecting means comprise spring means for retaining the end portions of said pinion shafts of the adjacent gear assembly in said openings in said connecting frame.

References Cited

UNITED STATES PATENTS

| | | | |
|---|---|---|---|
| 417,840 | 12/1889 | Ross | 74—681 X |
| 2,470,589 | 5/1949 | Torkelson | 74—757 X |
| 2,908,188 | 10/1959 | Maybarduk | 74—674 |
| 2,957,371 | 10/1960 | Wang | 74—674 X |

FOREIGN PATENTS

| | | |
|---|---|---|
| 872,004 | 5/1953 | Germany. |

DONLEY J. STOCKING, Primary Examiner

THOMAS C. PERRY, Assistant Examiner

U.S. Cl. X.R.

74—674, 675